UNITED STATES PATENT OFFICE.

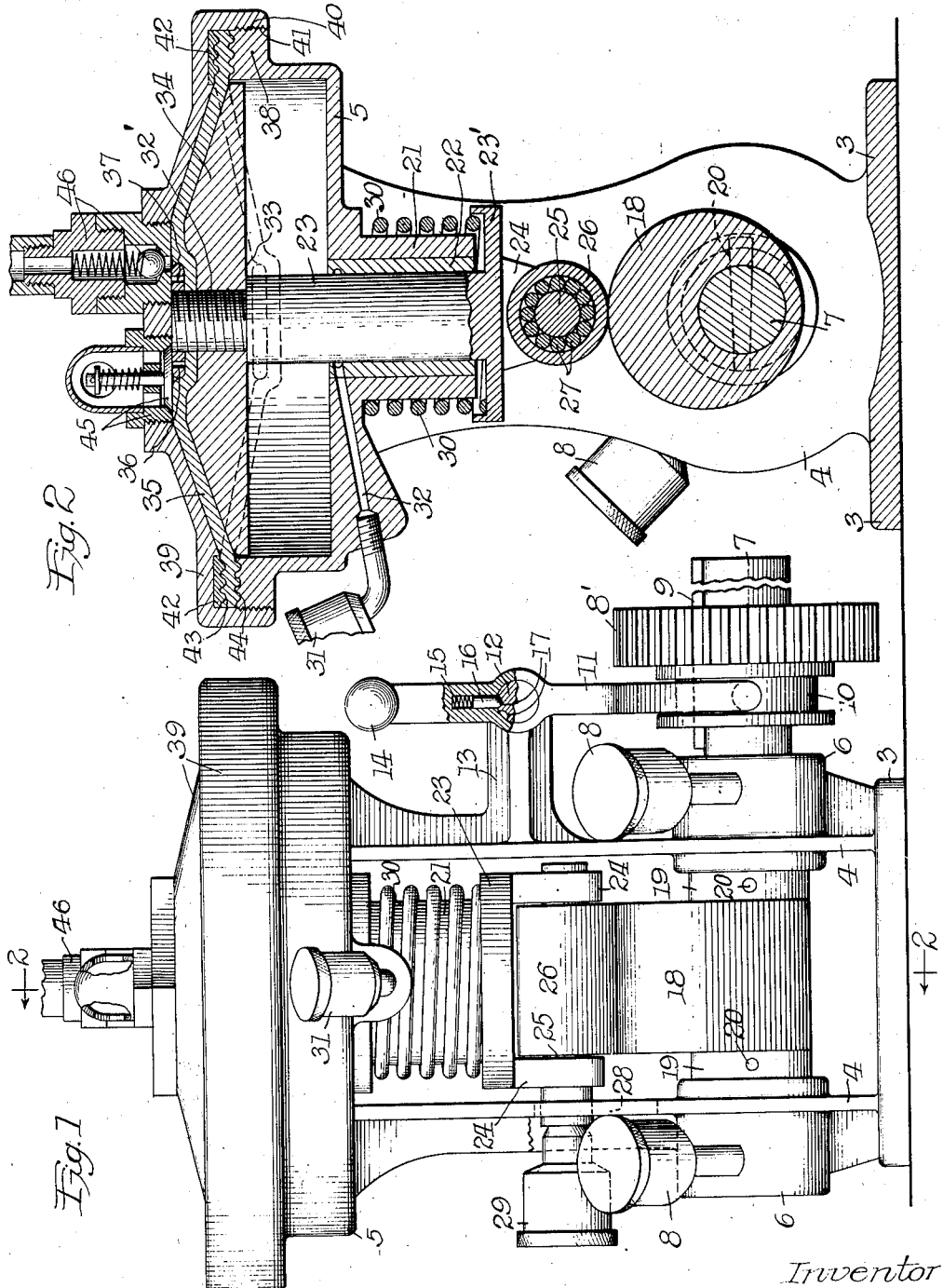

GUSTAVE P. JOHNSON, OF WAUKEGAN, ILLINOIS.

PUMP.

1,339,563. Specification of Letters Patent. Patented May 11, 1920.

Application filed May 7, 1915. Serial No. 26,474.

*To all whom it may concern:*

Be it known that I, GUSTAVE P. JOHNSON, a citizen of the United States, residing at Waukegan, in the county of Lake and State of Illinois, have invented a certain new and useful Improvement in Pumps, of which the following is a full, clear, concise, and exact description, reference being had to the accompanying drawings, forming a part of this specification.

My invention relates to pumps and is concerned particularly with an air compressing machine such as may conveniently be used upon automobiles, as a part of the equipment, for the purposes of pumping up the tires.

It is the object of my invention to produce a device for the purpose specified which will be of simple and durable construction, of economical manufacture, and of efficient operation. In connection with the object of producing a device of high efficiency, I have particularly in mind the production of a machine in which leakage is reduced to a minimum, if not entirely eliminated. In this same connection, it is also my idea to produce a device of maximum displacement for the size of the machine as a whole and the manner in which I secure this result will becomes evident as this description proceeds.

It is a further object of my invention to provide a structure in which all the parts are easily accessible and in which the wearing parts, in this instance a diaphragm, may be quickly and conveniently replaced.

My invention will be better understood by reference to the accompanying drawings, in which—

Figure 1 is an elevational view of the structure of my invention, parts being broken away to illustrate details of construction, and Fig. 2 is a sectional view taken on the plane of the line 2, 2, of Fig. 1, looking in the direction indicated by the arrows.

The general framework comprises a base 3, the uprights 4, 4, and, at the top, the diaphragm casing 5. The lower portion of the diaphragm casing, as illustrated in Fig. 2, is conveniently made integral with the upright and the base.

Each of the uprights 4, 4, is provided with a bearing 6 and in the two bearings 6, 6, a shaft 7 is mounted, the bearings being provided with grease cups 8, 8. On one side the shaft 7 is extended beyond the bearing 6 and a gear wheel 8' is mounted upon this extension, being so set upon the shaft that it may move longitudinally thereon but always moves rotatably therewith, this action being secured by means of the spline 9. A grooved collar 10 is either integral with the gear wheel 8' or is secured thereto, and the forked lever 11 coöperates with the grooves in this collar. The lever 11 is pivoted upon a stud 12 which, in turn, is carried by a bracket 13 extending from the uprights 4. The upper end of the lever 11 is provided with an operating handle 14 and it will now be seen that the movement of the operating handle 14 in one direction or the other will result in the movement of the gear 8' upon the shaft 7 in the opposite direction, due to the engagement of the lower forked end of the lever 11 in the groove in the collar 10. In order to retain the lever 11 in either of its adjusted positions, the lever is provided with a socket 15 in which a spring pressed plunger 16 is disposed, this plunger being adapted to be lodged in one or the other of the pockets 17 in the periphery of the stud 12, the pockets being so disposed as to determine the proper positions, both operative and inoperative, of the lever. It will be understood that the gear 8' is adapted to coöperate with a meshing pinion suitably operated by the engine. The movement of the lever 11 moves the gear back and forth on the shaft so as to bring it into and out of engagement with the pinion referred to.

Between the uprights 4, 4, the shaft 7 is provided with an eccentric 18, which is provided on each side with a collar 19. The collars are provided with cotter pins 20, 20, so as to firmly mount the eccentric on the shaft.

Upon the under side of the casing part 5 an axial stud 21 is provided and a bushing 22 is mounted in this stud. A sliding rod 23 is mounted in the bushing 22 and is provided upon its lower end with a head 23' which, in turn, has two downwardly projecting lugs 24, 24, secured thereto. A short shaft 25 is mounted in these lugs and the eccentric follower 26 is mounted upon the shaft 25 through the intervention of the roller bearings 27, 27. Upon one side the shaft 25 is extended sufficiently beyond the lug 24 so as to extend through a slot 28 in the upright 4. Upon the outside of the upright the end of the shaft 25 is provided with a grease cup 29 which provides for the lubrication of the cam follower.

A helical spring 30 is disposed between the under side of the casing 5 and the head 23' and tends to force the head downwardly, thus keeping the cam follower 26 in constant engagement with the eccentric 18. A grease cup 31 is provided to keep the rod 23 lubricated in its bearings, by way of the passageway 32.

At the top the rod 23 is reduced to form the threaded portion 32' and the shoulder 33. A disk 34 takes over this reduced portion and rests upon the shoulder 33, this disk being of a diameter slightly smaller than the inside diameter of the casing 5 which is made of cylindrical form. A flexible diaphragm 35 of circular form is provided and, in putting it in place, is laid upon the disk 34, being provided with a central opening to pass over the portion 32' of the rod 23. Once in place, this flexible diaphragm is clamped down tightly upon the central portion of the disk 34 by means of a nut 36 which is screwed upon the portion 32' and is provided with holes 37, 37, for the reception of a tightening tool. It will be seen that the central portion of the upper part of the disk 34 is dished for the clamping reception of the diaphragm 35, all as illustrated in Fig. 2, and it will also be seen that when this nut is driven home the disk is clamped firmly down upon the shoulder 33.

The casing 5 is provided upon the top with a peripheral flange 38 and the periphery of the diaphragm 35 rests upon this flange and is of commensurate diameter. The face of the flange 38 is corrugated, as illustrated. After the diaphragm has been laid upon the face of the flange 38 the cover 39 is disposed in place. This cover is internally screw-threaded at 40 and is thus adapted to be threaded upon the peripheral screw threads 41 on the flange 38. A loose iron ring 42 is disposed upon the inside of the cover 39, as illustrated in Fig. 2, and the bottom face of this ring is corrugated, as illustrated at 43, to correspond, in a measure, with the corrugations 44 upon the top of the flange 38. Also, the flexible diaphragm 35 is clamped between these two corrugated surfaces and it will be clear that when the cover is screwed down firmly the diaphragm will be firmly held between the two parts of the casing which thus form a diaphragm chamber. This manner of installing the diaphragm and of securing the cover of the diaphragm chamber to the base portion thereof provides for the ready access to the diaphragm for the purposes of inspection, repair and renewal and also provides for an absolutely air-tight fit between the two parts of the chamber, since at all points in the periphery of the chamber the diaphragm acts as a packing element firmly clamped down at all points. In the top of the cover 39 the air inlet valve structure 45 is provided and the outlet valve structure 46 is also provided. The precise details of these two valves are not of importance here and I shall not burden this description by going into their details. Suffice it to say that the valve 45 is a puppet valve which admits air while the valve 46 is a check valve past which the compressed air is forced.

It will be seen that the diaphragm is held at the periphery and at the center, leaving a large free area between the two flanged surfaces, thus allowing a maximum movement of the diaphragm, into the position shown in dotted line, and providing for a complete and emphasized throw of the diaphragm so that maximum displacement may be secured. It will also be seen that when the cover is being screwed into place it will move upon the ring 42 and there will be no tendency to damage the flexible diaphragm. The operation is simple. The rotation of the shaft 7 causes the operation of the eccentric and the disk 34 carries the center of the diaphragm and follows the movement of the eccentric follower. It will also be seen that the formation of the disk is such that it expels all but a negligible amount of air upon each upward stroke thus preserving and contributing to the operating efficiency of the structure.

I claim as new and desire to secure by Letters Patent:

1. In a pump, a supporting structure, a collapsible chamber carried thereby and formed by a rigid cover and a flexible diaphragm, an operating shaft, an eccentric on said shaft, a reciprocating rod having a follower, resilient means tending to hold said follower in engagement with said eccentric, and a disk carried by said rod, the center of said diaphragm being secured to said rod by means of a washer sunk into said disk and said diaphragm being adapted to fill the space between said cover and said disk at one extreme of the stroke of said rod and being adapted to be drawn taut at the other extreme.

2. In a pump, a diaphragm chamber base, a cover therefor, screw threaded on said base, a reciprocating rod mounted in said base, a disk carried by said rod, a diaphragm clamped between said cover and said base and secured to the center of said disk, an operating shaft, an eccentric on said shaft, a follower on said reciprocating rod, and resilient means tending to hold said follower in engagement with said eccentric, said diaphragm surface being unbroken and adapted to fill completely the space between said cover and said disk at one extreme of the stroke of said rod and being adapted to be drawn taut at the other extreme.

3. In a pneumatic pump, a diaphragm chamber base, a cover therefor, said cover being dished outwardly, a diaphragm of rubber or the like clamped between said cover and said chamber base, said cover and said chamber base having coöperating screw threads adapting said cover to thread upon said base, a loose ring interposed between said cover and said diaphragm for preventing injury to said diaphragm in threading said cover on said base, the under face of said ring having annular corrugations therein coöperating with matched corrugations in the face of said base to bind the periphery of said diaphragm therebetween, a disk beneath said diaphragm of substantially the same diameter as said diaphragm chamber, said disk having an outwardly dished formation to coöperate with said cover, an operating rod connected to said disk, means for reciprocating said rod, and means for attaching the center only of said diaphragm to said disk, said attaching means being countersunk in said disk whereby the upper surface of said diaphragm and disk presents an unbroken surface adapted to completely close the diaphragm chamber.

In witness whereof I hereunto subscribe my name this 1st day of May, A. D. 1915.

GUSTAVE P. JOHNSON.